US007299137B2

(12) United States Patent
Bartley et al.

(10) Patent No.: US 7,299,137 B2
(45) Date of Patent: Nov. 20, 2007

(54) METHOD FOR DRIVE CYCLE SIMULATION USING NON-ENGINE BASED TEST SYSTEM

(75) Inventors: Gordon J. Bartley, San Antonio, TX (US); Andy M. Anderson, San Antonio, TX (US); Cynthia C. Webb, San Antonio, TX (US); Bruce B. Bykowski, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 569 days.

(21) Appl. No.: 10/847,034

(22) Filed: May 17, 2004

(65) Prior Publication Data

US 2004/0237636 A1 Dec. 2, 2004

Related U.S. Application Data

(63) Continuation-in-part of application No. 10/213,890, filed on Aug. 6, 2002, now Pat. No. 7,140,874.

(51) Int. Cl.
*G01B 3/44* (2006.01)

(52) U.S. Cl. ......................... 702/34; 702/184; 702/185

(58) Field of Classification Search .................. 702/34, 702/184, 185

See application file for complete search history.

(56) References Cited

U.S. PATENT DOCUMENTS 1,102,510 A 7/1914 Irish
3,030,773 A 4/1962 Johnson
3,131,749 A 5/1964 Davis
3,176,751 A 4/1965 Gerlitz
3,503,715 A 3/1970 Haensel
3,630,024 A 12/1971 Hopkins
3,685,740 A 8/1972 Sheperd
3,694,135 A 9/1972 Dancy et al.

(Continued)

FOREIGN PATENT DOCUMENTS

DE 918699 7/1949

(Continued)

OTHER PUBLICATIONS

Proceedings of the Eighth CRC On-Road Vehicle Emissions Workshop, Apr. 20-22, 1998, vol. 2.

(Continued)

*Primary Examiner*—Michael Nghiem
*Assistant Examiner*—Stephen J. Cherry
(74) *Attorney, Agent, or Firm*—Baker Botts, L.L.P.

(57) ABSTRACT

A method for simulating at least one drive cycle of a vehicle using a non-engine based test system, the method including providing a non-engine based test system including a combustor in fluid communication with a catalytic converter from the vehicle; supplying fuel and air to said combustor at an air to fuel ratio (AFR) and under conditions effective to produce a feedstream flowpath; substantially stoichiometrically combusting at least a portion of the fuel in the feedstream flowpath under conditions effective to simulate at least one drive cycle of the vehicle and to produce a simulated drive cycle exhaust product for the vehicle, the conditions being effective to prevent substantial damage to the combustor; and, collecting and analyzing the simulated drive cycle exhaust product.

16 Claims, 2 Drawing Sheets

U.S. PATENT DOCUMENTS

| | | | |
|---|---|---|---|
| 3,818,846 | A | 6/1974 | Reese |
| 3,890,088 | A | 6/1975 | Ferri |
| 4,035,137 | A | 7/1977 | Arand |
| 4,054,418 | A | 10/1977 | Miller et al. |
| 4,118,171 | A | 10/1978 | Flanagan et al. |
| 4,270,896 | A | 6/1981 | Polinski |
| 4,383,411 | A | 5/1983 | Riddel |
| 4,651,524 | A | 3/1987 | Brighton |
| 4,845,940 | A | 7/1989 | Beer |
| 4,878,380 | A | 11/1989 | Goodman |
| 5,085,577 | A | 2/1992 | Muller |
| 5,140,814 | A | 8/1992 | Kreutmair et al. |
| 5,149,261 | A | 9/1992 | Suwa et al. |
| 5,267,851 | A | 12/1993 | Washam et al. |
| 5,288,021 | A | 2/1994 | Sood et al. |
| 5,320,523 | A | 6/1994 | Stark |
| 5,339,630 | A | 8/1994 | Pettit |
| 5,396,794 | A | 3/1995 | Nichols |
| 5,493,171 | A | 2/1996 | Wood |
| 5,529,048 | A | 6/1996 | Kurihara et al. |
| 5,553,450 | A | 9/1996 | Schnaibel et al. |
| 5,584,178 | A | 12/1996 | Naegeli et al. |
| 5,592,924 | A | 1/1997 | Audisio |
| 5,626,014 | A | 5/1997 | Hepburn |
| 5,693,874 | A | 12/1997 | De La Cruz et al. |
| 5,713,336 | A | 2/1998 | King |
| 5,826,428 | A | 10/1998 | Blaschke |
| 5,860,277 | A | 1/1999 | Schnaibel et al. |
| 5,899,062 | A | 5/1999 | Jerger et al. |
| 5,974,787 | A | 11/1999 | Lemire et al. |
| 5,974,788 | A | 11/1999 | Hepburn et al. |
| 5,998,210 | A | 12/1999 | Hepburn et al. |
| 6,071,113 | A | 6/2000 | Tsubouchi et al. |
| 6,269,633 | B1 | 8/2001 | Van Nieuwstadt |
| 6,298,729 | B1 | 10/2001 | Locker |
| 6,301,875 | B1 | 10/2001 | Backlund et al. |
| 6,378,359 | B1 | 4/2002 | Dobson et al. |
| 6,382,182 | B1 | 5/2002 | Green |
| 6,490,858 | B2 | 12/2002 | Barrett et al. |
| 6,586,254 | B1 | 7/2003 | Kumar |
| 6,594,990 | B2 | 7/2003 | Kuenstler |
| 6,713,025 | B1 | 3/2004 | Ivanescu |
| 2001/0054281 | A1 | 12/2001 | Adams et al. |
| 2003/0012700 | A1 | 1/2003 | Carnahan |
| 2003/0079520 | A1 | 5/2003 | Ingalls et al. |
| 2004/0007056 | A1 | 1/2004 | Webb et al. |
| 2004/0025580 | A1 | 2/2004 | Webb et al. |
| 2004/0028588 | A1 | 2/2004 | Webb et al. |

FOREIGN PATENT DOCUMENTS

| | | | |
|---|---|---|---|
| DE | 3020030 | | 12/1981 |
| EP | 0590699 | A | 4/1994 |
| EP | 000895024 | A2 | 2/1999 |
| EP | 000961013 | A2 | 12/1999 |
| FR | 2674333 | | 9/1992 |
| GB | 2329853 | | 7/1999 |
| GB | 2356826 | | 6/2001 |
| JP | 51-111927 | | 10/1976 |
| JP | 56-49820 | | 5/1981 |
| JP | 04-72410 | | 3/1992 |
| JP | 06-264740 | | 9/1994 |
| JP | 07-198127 | | 8/1995 |
| JP | 11-159386 | | 6/1999 |
| JP | 11-270808 | | 10/1999 |

OTHER PUBLICATIONS

SAE Presents Automotive Systems Testing Toptec, Oct. 14-15, 1998, Novi, Michigan.

Southwest Research Institute Marketing Brochure, Fuel/Oil Catalyst Aging System, Feb. 1999.

Jovanovic, Modified apparatus for the simulation of engine exhaust emissions, Goriva Maziva, 1984, pp. 33-38, vol. 23(1).

Southwest Research Institute, Unique SwRI-developed procedures and analytical tools to assist vehicle manufacturers in meeting SULEV standards, Southwest Research Institute News, Feb. 23, 1998, Southwest Research Institute, San Antonio, Texas.

Casinhas et al., A Pyrolysis cell as simulator for an automobile catalytic converter, Vacuum, 1999, pp. 89-97, vol. 52, Elsevier Science Ltd.

Hepburn, A Comparison Between the Combustion of Isooctane, Methanol, and Methane in Pulse Flame Combustors with Closed-Loop A/F Control. SAE Technical Paper 920799,-1992, SAE International.

Southwest Research Institute, Further Advances in Exhaust Aftertreatment, Promotional Brochure, Feb. 1994, San Antonio, TX.

Selby, Development and Significance of the Phosphorus Emission Index of Engine Oils, 13th International Colloquium Tribology—Lubricants, Materials, and Lubrication, 2002, pp. 1-9.

Otto et al., A Laboratory Method for the Simulation of Automobile Exhaust and Studies of Catalyst Poisoning, Journal of the Air Pollution Control Association, Jun. 1974, vol. 24, No. 6.

Ingalls et al., Development of Catalyst Poisoning Evaluation Procedure, 08-9920, Internal Research & Development Program, Annual Report, 1996, p. 53, Southwest Research Institute, San Antonio, Texas.

Ingalls et al., Develop and Test an Apparatus to Evaluate Fuel and Lube Oil Effects on Automotive Catalysts, 08-9949, Internal Research & Development Program, Annual Report, 1996, pp. 53-54, Southwest Research Institute, San Antonio, Texas.

Webb et al., Development of a Methodology to Separate Thermal from Oil Aging of a Catalyst Using a Gasoline-Fueled Burner System, SAE Technical Paper 2003-01-0663, 2003, SAE International.

Webb et al., PC-Based Control of a Gasoline-Fueled Burner Aging Test Stand to Simulate Engine Exhaust, LabVIEW for Automotive, Telecommunications, Semiconductor, Biomedical, and other Applications, National Instruments Virtual Instrumentation Series, 2000, Prentice Hall.

Webb et al., Catalyst Aging Evaluation with Exposure to 0.06 and 0.11 Percent Phosphorus Oils Using the FOCUS Burner System, JSAE 20030269, 2003, SAE 2003-01-1999, Society of Automotive Engineers, Inc.

Drury et al., The Effect of Lubricant Phosphorus Level on Exhaust Emissions in a Field Trial of Gasoline Engine Vehicles, SAE Technical Paper 940745, 1994, SAE International.

Ueda et al., Engine Oil Additive Effects on Deactivation of Monolithic Three-Way Catalysts and Oxygen Sensors, SAE Technical Paper 940746, 1994, SAE International.

Williamson, Catalyst Deactivation Due to Glaze Formation From Oil-Derived Phosphorus and Zinc, SAE Technical Paper 841406, 1984, SAE International.

Joy et al., Influence of Phosphorus on Three-Component Control Catalysts: Catalyst Durability and Characterization Studies, SAE Technical Paper 852099, 1985, SAE International.

Cully et al., The Impact of Passenger Car Motor Oil Phosphorus Levels on Engine Durability, Oil Degradation, and Exhaust Emission in a Field Trial, SAE Technical Paper 952344, 1995, SAE International.

Cully et al., The Impact of Passenger Car Motor Oil Phosphorus Levels on Automotive Emissions Control Systems, SAE Technical Paper 961898, 1996, SAE International.

Ball et al., Application of Accelerated Rapid Aging Test (RAT) Schedules with Poisons: The Effects of Oil Derived Poisons, Thermal Degradation, and Catalyst Volume on FTP Emissions, SAE Technical Paper 972846, 1997, SAE International.

Beck et al., Impact of Sulfur on the Performance of Vehicle-Aged Palladium Monoliths, Applied Catalysis B: Environmental 6, 1995, vol. 185-200.

Jobson et al, Spatially Resolved Effects of Deactivation on Field-Aged Automotive Catalysts, SAE Technical Paper 910173, 1991, SAE International.

Minutes—Oil Protection of Emission System Test II Task Force Held on Aug. 19, 1999, ASTM, Sep. 27, 1999. (Redacted).
Minutes—Oil Protection of Emission System Test II Task Force Held on May 23, 2000, ASTM, Jun. 8, 2000. (Redacted).
Minutes—Oil Protection of Emission System Test (OPEST) II Task Force Held Apr. 4, 2001, ASTM, May 2, 2001, San Antonio, TX. (Redacted).
PCT International Search Report, PCT/US05/15514, 8 pages.

METHOD FOR DRIVE CYCLE SIMULATION USING NON-ENGINE BASED TEST SYSTEM

PRIORITY DATA

Related Applications

The present application is a continuation-in-part of U.S. patent application Ser. No. 10/213,890, filed Aug. 6, 2002, now U.S. Pat. No. 7,140,874 incorporated herein by reference. This application is related to co-pending U.S. patent application Ser. No. 11/470,471 filed Sep. 6, 2006; U.S. patent application Ser. No. 11/420,393 filed May 25, 2006; U.S. patent application Ser. No. 11/326,983 filed Jan. 6, 2006; U.S. patent application Ser. No. 10/917,230 filed Aug. 12, 2004; U.S. patent application Ser. No. 10/917,245 filed Aug. 12, 2004; U.S. patent application Ser. No. 10/918,330 filed Aug. 12, 2004; U.S. patent application Ser. No. 10/847,034 filed May 17, 2004; U.S. patent application Ser. No. 10/458,023 filed Jun. 10, 2003; U.S. patent application Ser. No. 10/439,146 filed May 15, 2003, now U.S. Pat. No. 6,983,545 B2; and U.S. patent application Ser. No. 10/457,916 filed Jun. 10, 2003.

FIELD OF THE INVENTION

The present application relates in general to a method of using a non-engine based test system to perform emissions testing.

BACKGROUND

Vehicle based systems for performing emissions testing using Federal Test Procedures (FTP) have several disadvantages, such as driver variability and long vehicle soak times (12 hours). More precise and efficient alternative methods would be advantageous to perform FTP test procedures used in research and development work.

SUMMARY OF THE INVENTION

The present application provides a method for simulating at least one drive cycle of a vehicle using a non-engine based test system. The method comprises: providing a non-engine based test system comprising a combustor in fluid communication with a catalytic converter from the vehicle; supplying fuel and air to said combustor at an air to fuel ratio (AFR) and under conditions effective to produce a feedstream flowpath; substantially stoichiometrically combusting at least a portion of the fuel in the feedstream flowpath under conditions effective to simulate at least one drive cycle of the vehicle and to produce a simulated drive cycle exhaust product for the vehicle, the conditions being effective to prevent substantial damage to the combustor; and, collecting and analyzing the simulated drive cycle exhaust product.

BRIEF DESCRIPTION

Figure 2:
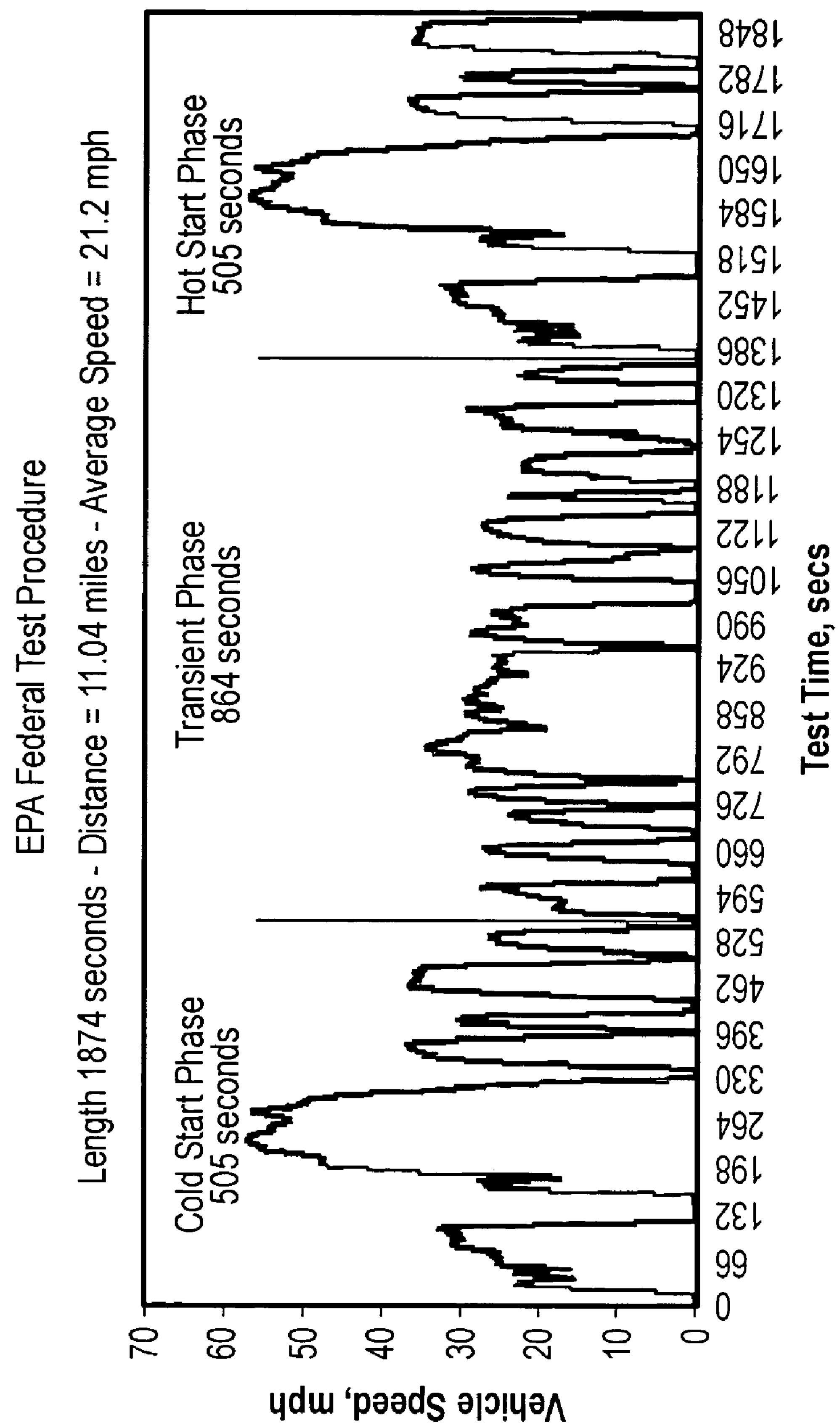
FIG. 2 is an FTP 75 Drive Cycle Trace.

The FTP 75 vehicle emissions test was developed in approximately 1975 to measure emissions from vehicles using a chassis dynamometer. The drive trace for the FTP test is shown in FIG. 2. In order to perform emissions testing, a vehicle is set up on a chassis dynamometer, and the specified test procedures are performed to obtain emissions values that can be used to certify a vehicle for sale. The FTP-75 test is an emissions tests procedure and is defined in the Code of Federal Regulations (CFR 40, Part 86).

The use of a vehicle-based apparatus to perform FTP test procedures creates some disadvantages, particularly in research and development work. A primary disadvantage is inefficiency. During aging (typically accelerated aging on an engine), the test stand must be brought down and the catalytic converter must be removed and installed on the test vehicle. The vehicle then is driven over the drive cycle by a human driver, and is soaked (or turned off) overnight for test preparation. Due to the time required for all of the vehicle systems to cool down to approved ambient conditions, only one cold-start FTP test can be performed per day using a vehicle-based system.

Another disadvantage of vehicle-based testing is a lack of precision. One source of reduced precision is the use of a human driver to simulate the drive cycle. Humans are susceptible to driving the test differently from day to day. Another source of reduced precision is the many variables that affect overall emissions from a vehicle. Variations exist from vehicle-to-vehicle, and day to day on the same vehicle.

The present application solves the foregoing problems by using a non-engine based test system to perform drive cycle testing. A preferred non-engine based test system is an exhaust component rapid aging system (NEBECRAS) and a method for using same to simulate vehicle-based FTP test procedures.

A preferred NEBECRAS for use in the method is the "FOCAS® rig," described in U.S. Patent Application Publication No. 20030079520, published May 1, 2003, incorporated herein by reference. Briefly, the FOCAS® rig comprises: (1) an air supply system to provide air for combustion to the burner, (2) a fuel system to provide fuel to the burner, (3) a burner system to combust the air and fuel mixture and to provide the proper exhaust gas constituents, (4) a heat exchanger to control the exhaust gas temperature, (5) an oil injection system, and (6) a computerized control system. The foregoing components are illustrated in FIG. 1 and described in detail in U.S. Patent Application Publication No. 20030079520, which has been incorporated herein by reference, and will not be described in detail herein.

The FOCAS® rig was developed to evaluate the long term effects of the individual variables on the long term performance of the catalyst. The FOCAS® rig is capable of producing a simulated exhaust gas with a composition and temperature corresponding to that produced by the internal combustion engine of a motor vehicle.

Figure 1:
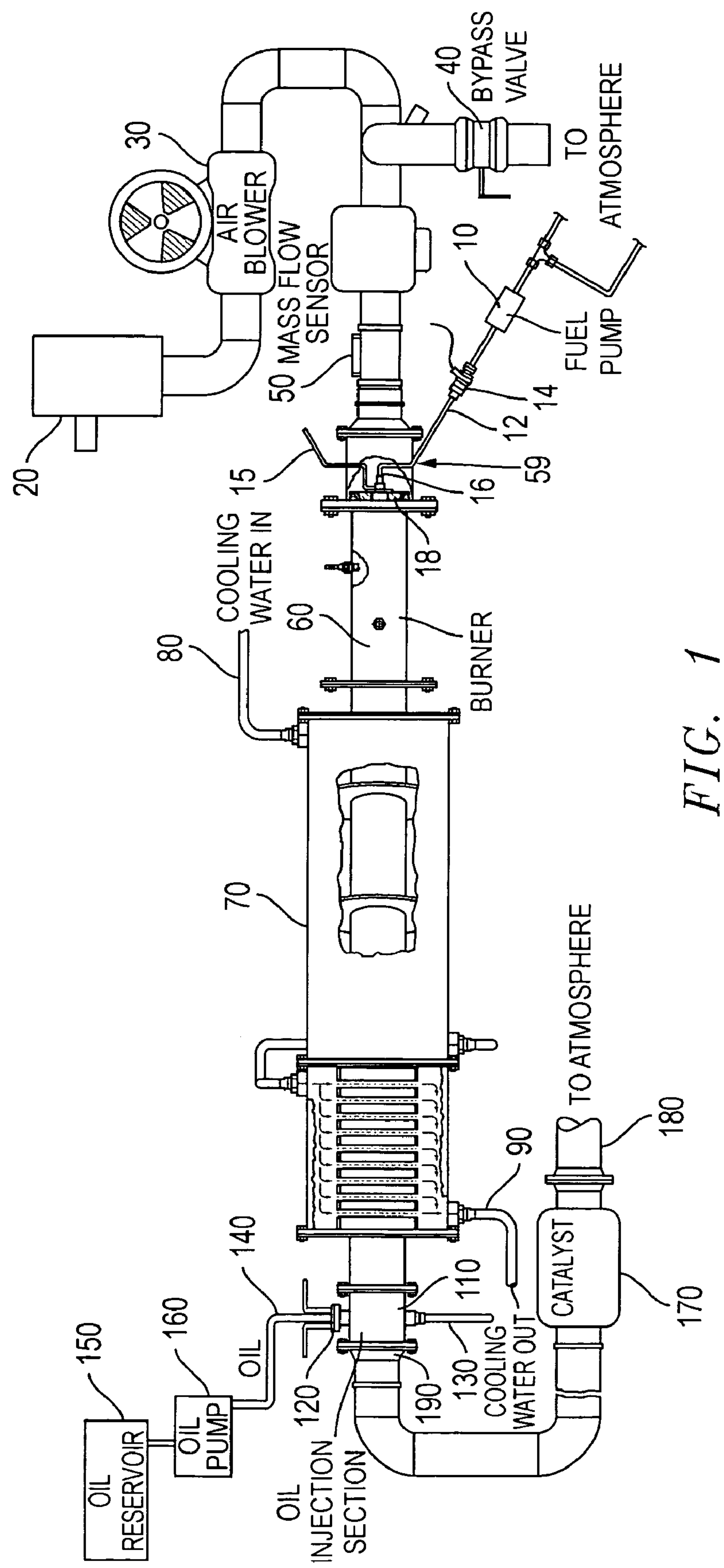
FIG. 1 is a schematic diagram of the FOCAS® rig, a preferred non-engine based exhaust component rapid aging system (NEBECRAS) for use herein, described in U.S. Patent Application Publication No. 20030079520, published May 1, 2003, incorporated herein by reference.

Referring now to the drawings and initially to FIG. 1, a schematic diagram of the system is shown. An air blower 30 draws ambient air through an inlet air filter 20 and exhausts a pressurized stream of air. The air blower 30 and the mass air flow sensor 50 may be of any conventional design which will be well known to a person of ordinary skill in the art. In a preferred embodiment the air blower 30 is an electric centrifugal blower, such as a Fuji Electric Model VFC404A Ring Blower, and the mass air flow sensor 50 is an automotive inlet air flow sensor such as a Bosh Model Number 0280214001 available from most retail automotive parts stores. The volume of air supplied is set by adjusting a bypass valve 40 to produce a desired flow rate of air, which is measured by a mass flow sensor 50.

The exhaust from the burner 60 is routed to a heat exchanger 70. The heat exchanger 70 may be of any conventional design which will be well known to a person of ordinary skill in the art. In a preferred embodiment the heat exchanger 70 consists of two sections. The upstream section consists of a water jacketed tube. The downstream section is a vertical cross flow shell and tube heat exchanger. The vertical cross flow design minimizes steam formation and steam trapping within the cooling tubes. The heat exchanger 70 is provided with an inlet water line 80 and an outlet water line 90 which supply and drain cooling water to cool the exhaust gas to a temperature simulating that which is present at the inlet to the catalytic converter of a typical motor vehicle.

The exhaust gas is next routed to an oil injection section 110 (FIG. 1). The oil injection section provides an atomized oil spray comprising oil droplets with a sufficiently small diameter to vaporize and oxidize the oil before it reaches the catalyst. The oil injection system may be located anywhere downstream from the burner.

A data acquisition and control system preferably provides a means to control ignition, air assist to the fuel injector, auxiliary air, fuel feed, blower air feed, oil injection, etc. (discussed more fully below). An example of a suitable control system would be a proportional integral derivative (PID) control loop, for example, for controlling fuel metering.

In a preferred embodiment, the data acquisition and control system is provided with a computer program to control the system and to acquire and process the signals from the measured parameters. The computer program can be written in a variety of different ways, which will be well known to persons versed in the art. The controller preferably is provided with a closed-loop fan control to maintain catalyst inlet temperature, preferably at from about −50.degree. C. to about +50.degree. C. about a setpoint temperature, preferably from about −5.degree. C. to about +5.degree. C. about a setpoint temperature. The setpoint temperature is dictated by the cycle being simulated.

The control system for the FOCAS.TM. Rig consists of a Lab VIEW-programmed PC equipped with a touch screen monitor and a multi-function DAQ card, connected to an SCXI chassis holding two SCXI 1120 multiplexing modules, one feed-through panel, and an SCXI 1160 "relay module" to monitor and record system information, and to control system electronics. Using the computer interface, the operator can switch power to the blowers and fuel pump, as well as control the air assisted fuel injectors, burner spark, oil injection, and auxiliary air, all with the touch of a finger.

The burner system in the FOCAS® rig is effective to substantially stoichiometrically combust at least a portion of fuel in the feedstream flowpath without substantial damage to the combustor. In a preferred embodiment, the combustor comprises a nozzle comprising a swirl plate which is effective even at a stoichiometric air to fuel ratio (AFR) of producing a feedstream flowpath comprising an air shroud effective to prevent flame from attaching to a nozzle supplying fuel and air to the combustor during combustion of fuel. The feedstream flowpath also preferably prevents flame from remaining in constant contact with an inner wall of the combustor during combustion of fuel.

Although the FOCAS® rig is preferred, it will be apparent to persons of ordinary skill in the art that any functional and effective non-engine based test system could be adapted for use in accordance with the principles described herein.

The Federal Test Procedure (FTP) uses the Urban Dynamometer Driving Schedule (UDDS). The UDDS is the result of more than ten years of effort by various groups to translate the Los Angeles smog-producing driving conditions to chassis dynamometer operations, and is a nonrepetitive drive cycle covering 7.5 miles in 1372 seconds with an average speed of 19.7 mph. Its maximum speed is 56.7 mph.

As seen in FIG. 1, the current FTP drive cycle consists of a cold-start, 505-second, cold transient phase (Bag 1), followed immediately by an 864-second stabilized phase (Bag 2). Following the stabilized phase, the vehicle is allowed to soak for 10 minutes with the engine turned off before proceeding with a hot-start, 505-second, hot transient phase (Bag 3) to complete the test. The drive cycle is 1874 seconds, for a distance of 11.04 miles, at an average speed of 21.2 miles per hour.

In order to perform the drive cycle using the non-engine based test system, the following features are controlled:

1) the exhaust flowrate is varied, typically in the range of from 0 to about 200 standard cubic feet per minute (scfm), to simulate the exhaust flowrates of the test vehicle throughout the FTP;
2) the exhaust gas temperature is varied, typically in the range of from about 20 to about 900° C., to simulate the exhaust gas temperatures at the catalyst inlet throughout the FTP; and,
3) the exhaust gas stoichiometry is varied, typically in the range of from about 10 to about 40 AFR, preferably from about 10 to about 20 AFR, to simulate the exhaust gas stoichiometry of the vehicle throughout the FTP.

Ideally, the FOCAS system exhaust gas mixture contains similar concentrations of hydrocarbons, carbon monoxide, and oxides of nitrogen as seen in the vehicle exhaust at any time during the FTP test. An idealized exhaust gas mixture could be created for research and development work by metering/doping the exhaust gas to create the proper component balance to match the vehicle exhaust throughout operation over the test cycle. The suitable idealized exhaust gas mixture would vary, with an example of a suitable idealized exhaust gas mixture (near stoichiometric) comprising the following components in the following ratios:

| HC | CO | $NO_x$ | $CO_2$ | $O_2$ | $H_2O$ |
|---|---|---|---|---|---|
| 1400 ppm $C_1$ | 0.5% | 2200 ppm | 14.5% | 0.65% | 10% |

The non-engine based test system software controls all of the above parameters simultaneously throughout the simulated FTP, and is programmable to simulate any desired set of test conditions.

Throughout the test cycle, the exhaust is collected, diluted, and thoroughly mixed with filtered background air to a known constant volume flowrate using a positive displacement pump. This procedure is known as Constant Volume Sampling (CVS). A proportional sample of the dilute exhaust is collected in a sample bag for analysis at the end of the test. The emissions are mathematically weighted to represent the average of several 7.5 mile trips made from cold and hot starts. A summary of suitable cycle duration, driving distance, and average speed is given in the following Table:

| Segment | Duration, seconds | Distance, miles | Average Speed, mph |
|---|---|---|---|
| Transient Phase | 505 | 3.60 | 25.7 |
| Stabilized Phase | 867 | 3.90 | 16.2 |
| UDDS Total | 1372 | 7.50 | 19.7 |

(FTP CYCLE IS UDDS + HOT-START TRANSIENT 505)

Exhaust emissions from the FTP cover the effects of vehicle and emission control system warm-up as the vehicle is operated over the cycle. The "stabilized" phase produces emissions from a fully warmed up or stabilized vehicle and emission control system. "Hot-start" or "hot transient" phase emissions result when the vehicle is started after the vehicle and emission control systems have stabilized during operation, and are then soaked (turned off) for 10 minutes.

Weighted total emissions from the FTP at 68° F. to 86° F. ambient temperature conditions are regulated by the EPA. The only regulated pollutant for the FTP at cold conditions (20° F.) is carbon monoxide (CO). Tier 1 cold-CO level for passenger cars is 10.0 g/mile. The California LEVII emissions standards for 2004 light-duty passenger cars, intermediate life—50,000 miles (the standards which the test vehicle was certified to) are:

| | |
|---|---|
| NMOG: | 0.04 g/mile |
| CO: | 1.7 g/mile |
| $NO_x$: | 0.07 g/mile |

The weighted total mass equivalent emissions for the EPA FTP-75 are calculated as required in the U.S. EPA regulations (40 CFR 86.144-90) using the following equation:

$$\text{Weighted g/mile} = 0.43 \times \frac{\text{Phase 1 grams} + \text{Phase 2 grams}}{\text{Phase 1 miles} + \text{Phase 2 miles}} + 0.57 \times \frac{\text{Phase 3 grams} + \text{Phase 2 grams}}{\text{Phase 3 miles} + \text{Phase 2 miles}}$$

The non-engine based test system, preferably a FOCAS® system, can be used for thermal aging. As a result, the burner may be deactivated at a predetermined age, the system may be cooled to ambient conditions in a matter of minutes, and then immediately after cooling, the system can be used to perform multiple simulated FTP's. The non-engine based test system can then be returned to aging, making the entire emissions test procedure very time-efficient. These advantages make it highly desirable as a research and development tool.

Persons of ordinary skill in the art will recognize that many modifications may be made to the present application without departing from the spirit and scope of the application. The embodiment described herein is meant to be illustrative only and should not be taken as limiting the application, which is defined in the claims.

We claim:

1. A burner-based system for producing exhaust that simulates exhaust produced by an internal combustion engine, for delivery of the exhaust to an emissions control device, comprising:

a burner system having at least a burner for receiving air and fuel and for combusting fuel to produce simulated engine exhaust;

an exhaust line for carrying the exhaust from the burner to the emissions control device;

a blower for cooling the exhaust gas; and a computerized control system programmed to control the system to simulate at least one engine drive cycle;

wherein the drive cycle is either a cold start or a hot start drive cycle, having a transient phase and a stabilized phase, each phase having a predetermined duration; and wherein the drive cycle is preceded by or followed by a cooling mode accomplished by cooling the exhaust gas with the blower.

2. The system of claim 1, wherein the cooling mode cools the exhaust gas to an ambient temperature.

3. The system of claim 1, wherein the drive cycle has a cold start, followed by a cold transient phase, followed by a stabilized phase.

4. The system of claim 1, wherein the drive cycle has a hot start, followed by a hot transient phase, followed by a stabilized phase.

5. The system of claim 1, wherein the drive cycle is performed by controlling the following conditions: the flowrate of the exhaust, the exhaust gas temperature, and the exhaust gas stoichiometry.

6. The system of claim 1, further comprising a heat exchanger for cooling the exhaust gas.

7. The system of claim 1, further comprising a liquid injector for injecting liquid substances into the exhaust line upstream the emissions control device.

8. A method for aging an exhaust emissions control device, comprising:

providing a burner for receiving air and fuel and for combusting a fuel feedstream to produce simulated engine exhaust;

providing an exhaust line for carrying the exhaust from the burner to the emissions control device;

placing an emissions control device on the exhaust line downstream the injector;

providing a blower for cooling the emissions control device;

using a computerized control system to simulate at least one engine drive cycle;

wherein the drive cycle is either a cold start or a hot start drive cycle, having a transient phase and a stabilized phase, each phase having a predetermined duration;

wherein the drive cycle is preceded by or followed by a cooling mode accomplished by cooling the exhaust gas with the blower.

9. The method of claim 8, further comprising using a heat exchanger to cool the exhaust gas downstream the burner.

10. The method of claim 8, further comprising using an injector to inject substances into the exhaust line downstream the burner and upstream the emissions control device.

11. The method of claim 8, further comprising controlling the following conditions: the exhaust flowrate, the exhaust gas temperature, and the exhaust gas stoichiometry.

12. The method of claim 8, wherein the exhaust flowrate is varied to any range of values between 0 to 200 cubic feet per second.

13. The method of claim 8, wherein the exhaust gas temperature is varied to any range of values between 20 to 900 degrees centigrade.

14. The method of claim 8, wherein the exhaust gas stoichiometry is varied to any range of values between 10 to 40 AFR.

15. The method of claim 8, further comprising providing exhaust to the emissions control device for a predetermined aging time prior to the drive cycle.

16. The method of claim 8, further comprising evaluating the operation of the emissions control device after one or more of the drive cycles are simulated.

* * * * *